Patented Aug. 12, 1924.

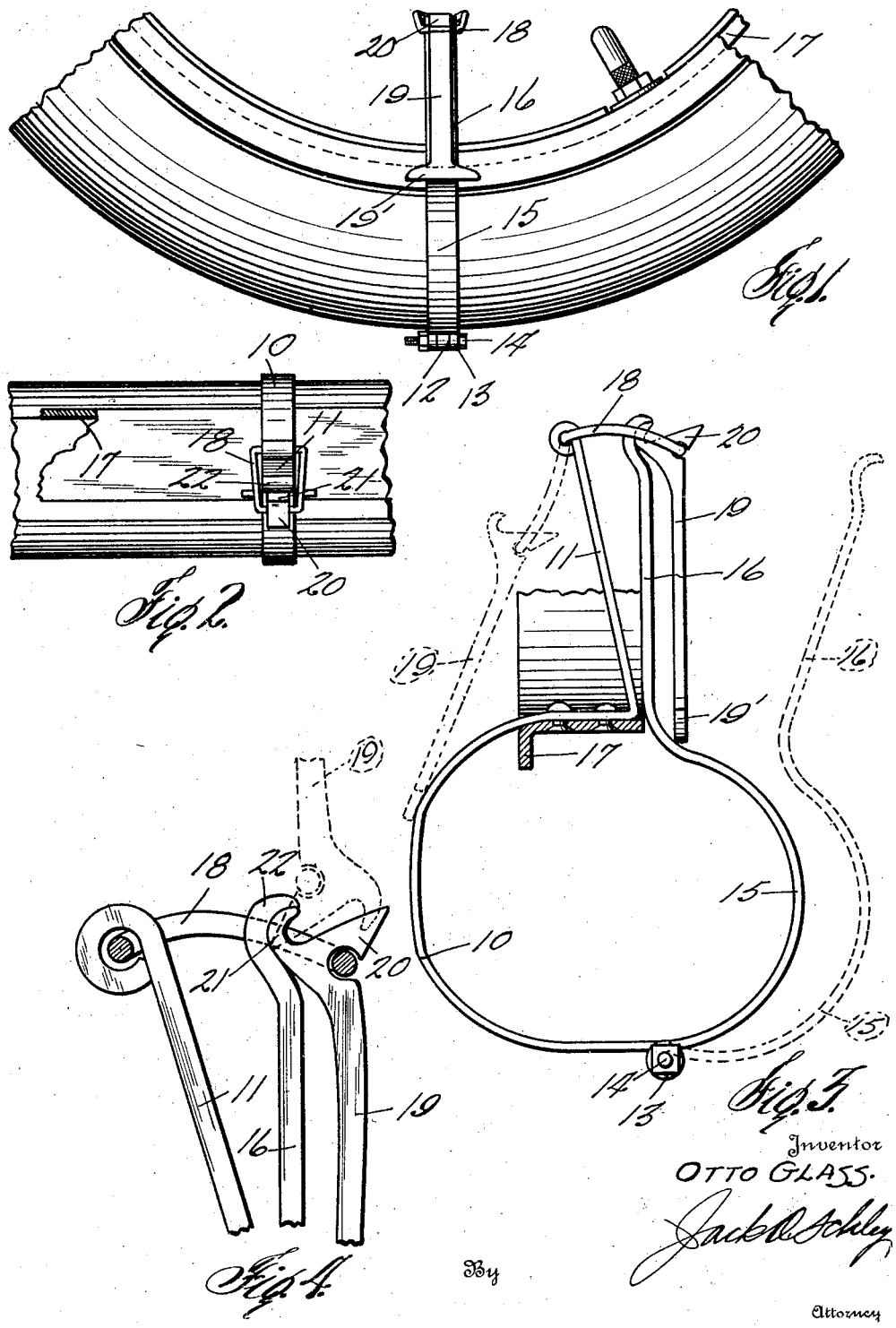

1,504,444

UNITED STATES PATENT OFFICE.

OTTO GLASS, OF ROSEBUD, TEXAS.

RIM AND TIRE CLAMP.

Application filed May 4, 1923. Serial No. 636,526.

*To all whom it may concern:*

Be it known that I, OTTO GLASS, citizen of the United States of America, residing at Rosebud, in the county of Falls and State of Texas, have invented certain new and useful Improvements in Rim and Tire Clamps, of which the following is a specification.

My invention relates to new and useful improvements in rim and tire clamps.

The object of the invention is to provide means for readily and easily fastening a spare tire and rim on the bracket usually carried on the rear of many makes of automobiles.

A particular object of the invention is to provide a clamp device of a single nature which will obviate the use of a plurality of nuts and bolts and other fastening elements and which permits of operation without tools or the like.

Another object is to provide a clamp which will be simple and substantial and to which a lock may be applied, thus eliminating the chain frequently used for securing the spare tire and rim against theft.

A device constructed in accordance with my invention together with other novel features will be hereinafter described.

The invention will be more readily understood from a reading of the following specification and by reference to accompanying drawings, in which an example of the invention is shown and wherein:

Fig. 1 is an elevation of the lower portion of a spare tire and rim mounted on a supporting bracket and fastened in place with a clamp constructed in accordance with my invention, Fig. 2 is a partial plan view of the same, Fig. 3 is an enlarged side elevation of the clamp, and Fig. 4 is a detail of the bail connection.

In the drawings the numeral 10 designates an arcuate supporting member preferably formed of strap metal and either cast or pressed into shape. At the upper end of the member 10 an arm 11 is bent upwardly and inwardly so as to overhang the member. A central hinge ear 12 is provided at the lower end of the member and engages between the ears 13 of an arcuate clamping lever 15, the ears being connected by a pintle 14. The lever has an upright extension 16 standing adjacent the arm 11 when the clamp is closed.

The member 10 is fastened on the lower central portion of the annular bracket 17 which is mounted on the rear of many automobiles. The bracket is disposed within the member and the front thereof is substantially flush with the intersection of the member and the arm 11. A link 18 is hinged to the upper end of the arm 11 and the upper end of a locking lever 19 is pivoted on the other end of the link. The free end of the lever 19 has a laterally extending handle 19′ by which the same may be swung.

The locking lever has a wedge shaped fulcrum lug 20 on its end adjacent the link and is also provided with a knuckle-hook 21 which is adapted to engage in a knuckle-hook 22 on the upper end of the arm. When the clamp is closed the parts 11, 16 and 19 stand in such close relation, immediately above the handle 19′, that an ordinary lock (not shown) may be engaged around the same so that the clamp cannot be released.

In using the clamp the lever 19 is swung upwardly so as to disengage the parts 21 and 22 and with the link 18 is swung down in rear of the arm 11 as is shown in dotted lines in Fig. 3. This permits the clamp lever 15 to be swung down and the member 10 is thus opened to receive the tire and rim A which is placed on the bracket 17 in the usual manner. After the tire and rim have been placed in position the lever 15 is swung upwardly and the extension 16 is pressed toward the arm 11. The lever 19 is grasped and the link 18 swung over the knuckle-hook 22 which latter is inserted within the link. The lever 19 is held in an upright position as is indicated in dotted lines in Fig. 4 and the point of the lug 20 is inserted in the part 22. By swinging the lever 19 downwardly the part 21 is brought into engagement with the part 16 and the clamp lever 15 pressed toward the member 10 whereby the tire A is forced into said member 10. By continuing the downward swing of the locking lever 19 the knuckle-hook 21 rides into the corresponding part 22 and the lever 15 is held in such close engagement with the tire as to place the parts under tension, whereby all play is absorbed.

With some tires it may not be necessary to use the fulcrum lug 20 and the part 21 may be hooked over the part 22 and the lever 19 swung downwardly to complete the clamping action. It is obvious that it would be possible to eliminate the lug 20 entirely and various changes and modifications may be made within the scope of the appended claims.

What I claim, is:

1. In a spare tire and rim clamp, a supporting member for attachment to the tire bracket of an automobile, an arcuate clamp lever hinged to the member and having an extension, an arm extending upwardly from the member, and a locking lever hinged to the arm and engaging the extension of the clamp lever.

2. In a spare tire and rim clamp, a supporting member for attachment to the tire bracket of an automobile, an arcuate clamp lever hinged to the member and having an extension, an arm extending upwardly from the member, a link hinged to the arm, and a locking lever hinged to the link and engaging the extension of the clamp lever.

3. In a spare tire and rim clamp, a supporting member for attachment to the tire bracket of an automobile, an arcuate clamp lever hinged to the member and having an extension, an arm extending upwardly from the member, a knuckle-hook at the upper end of the clamp lever extension, a link pivoted to the upper end of the arm, and a locking lever connected with the link and having a knuckle-hook engaging in the knuckle-hook of the extension when the locking lever is swung.

4. In a spare tire and rim clamp, a supporting member for attachment to the tire bracket of an automobile, an arcuate clamp lever hinged to the member and having an extension, an arm extending upwardly from the member, a knuckle-hook at the upper end of the clamp lever extension, a link pivoted to the upper end of the arm, and a locking lever connected with the link and having a fulcrum lug and also a knuckle-hook each adapted to engage with the knuckle-hook of the extension when the locking lever is swung to its closed position.

In testimony whereof I affix my signature.

OTTO GLASS.